Sept. 29, 1931.  H. DREW  1,825,341
OVERGEAR TRANSMISSION
Filed Aug. 5, 1927  2 Sheets-Sheet 1
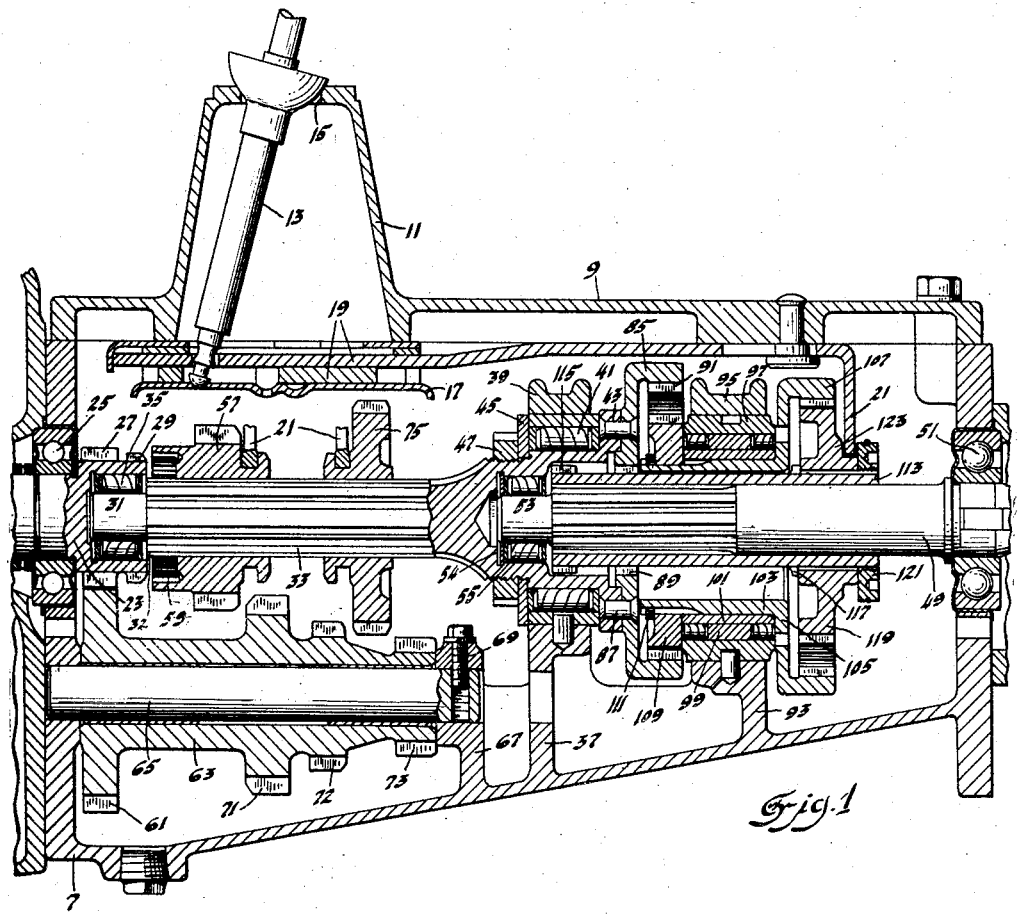

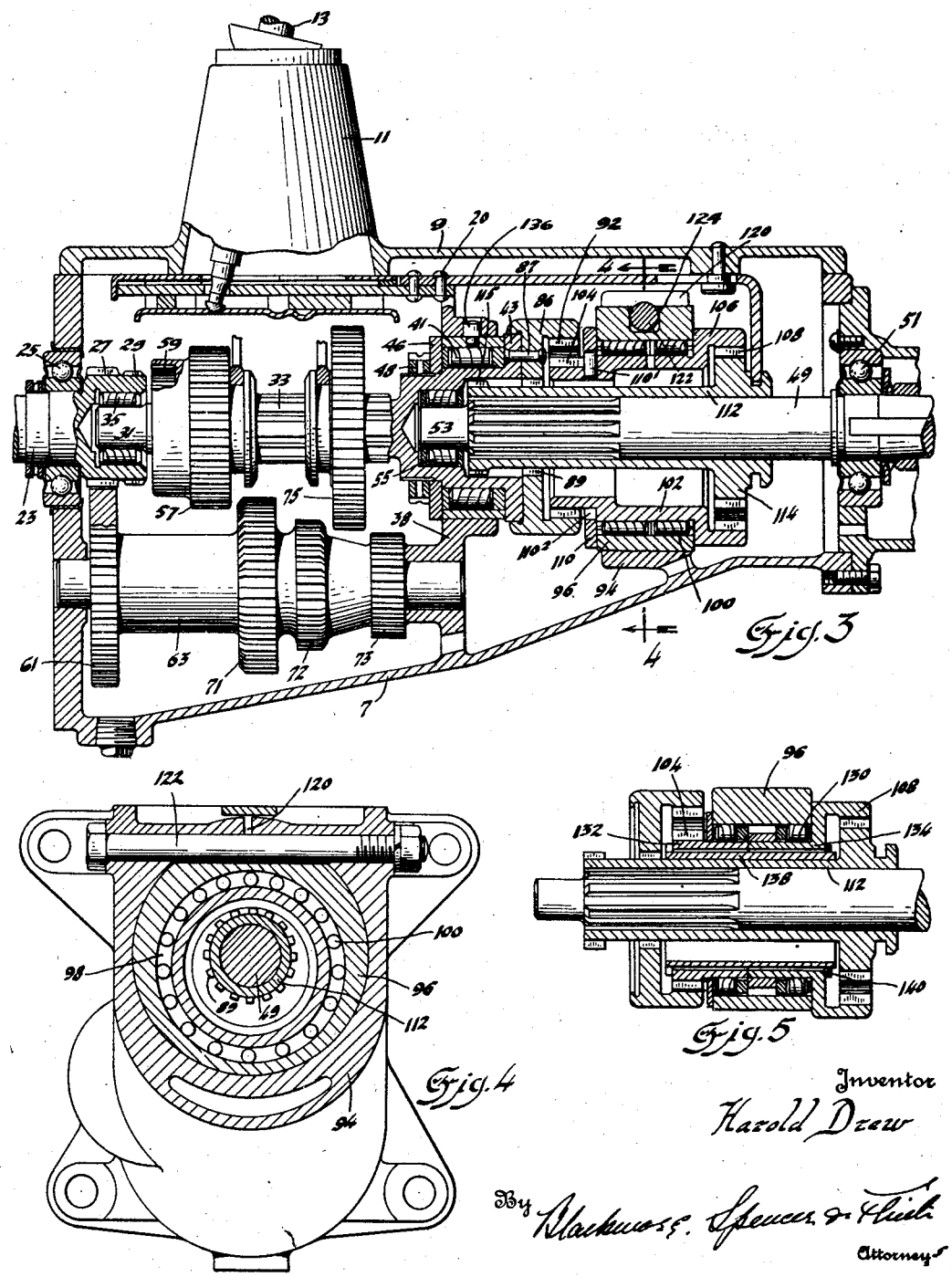

Patented Sept. 29, 1931

1,825,341

UNITED STATES PATENT OFFICE

HAROLD DREW, OF LANSING, MICHIGAN, ASSIGNOR TO GENERAL MOTORS CORPORATION, OF DETROIT, MICHIGAN, A CORPORATION OF DELAWARE

OVERGEAR TRANSMISSION

Application filed August 5, 1927. Serial No. 210,839.

This invention relates to change speed gearing and has been designed especially as an improvement in change speed mechanism for vehicles.

The invention has for its objects an increased number of speed ratios, greater flexibility, increased fuel economy, and lower engine speed in proportion to car speed. The invention is directed also to simplicity in assembly and aims to afford adequate bearing support for the several members constituting the transmission gearing.

Other objects and advantages will be understood from a reading of the following specification and an examination of the accompanying drawings.

In the drawings:

Fig. 1 is a longitudinal section through a change speed transmission embodying my improvements.

Fig. 2 is a sectional view of a detail.

Fig. 3 is a view corresponding to Figure 1 showing a modified form.

Fig. 4 is a transverse section on line 4—4 of Figure 3.

Fig. 5 shows in longitudinal section a built up overgear idler.

Referring to the drawings and first to Figs. 1 and 2, numeral 7 represents the transmission housing. The housing is provided with a cover 9, the cover having an upwardly extended enlargement 11 within which the lower end of the gear shift lever 13 is movable, suitable bearings for the lever being provided at 15 whereby the lever may move both longitudinally and transversely to make the necessary gear shifts.

The shifting mechanism per se is not claimed in this application and so much of it only is shown as is needed to indicate the relationship between the gear shift lever and the transmission gearing.

There is a supporting plate 17 carried by the cover 9 and slidably mounted above the supporting plate are shifting plates 19. These shifting plates 19 are integral with or connected to forks 21, which, as customary, are associated with collars on the several gear elements.

Entering the front wall of the casing is a clutch shaft 23. The shaft 23 is rotatably mounted and supported in suitable bearings 25. Just within the casing the shaft 23 has external gear teeth 27 and beyond the gear teeth at the end of the shaft are external clutch teeth 29. The end of the shaft is open and receives the reduced end 31 of a spline shaft 33, bearings 35 being provided to prevent friction. These bearings 35 are held between the shoulder between the larger and smaller parts of the shaft and retaining means 32 on the end of the shaft. Substantially at the middle of the transmission housing is a partition 37. This partition, together with a cap 39, houses roller bearing 41 within which is received the rear enlarged end of the spline shaft 33. The end of the spline shaft is formed with a radial flange 43 engaging one end of the bearing 41, and for positioning the shaft 33 a ring member 45 surrounds the shaft 33 adjacent the bearing 41 and is held in position on the shaft by suitable fastening means 47. A driven shaft 49 extends through the rear wall of the transmission housing, suitable bearings 51 being provided for its support. The shaft 49 at its front end is reduced in diameter as at 53. This reduced end 53 is piloted within the open rear end of shaft 33 and surrounding the reduced end 53 within the open end of shaft 33 are anti-friction bearings 55. Bearings 55 are held against the shoulder at the reduced end of the shaft by retaining means 54. By this provision of shaft alignment and shaft bearings a very rigid support is afforded for the rotating shafts.

The spline shaft 33 is to be driven by the driving shaft 23 at the same speed or at a plurality of reduced speeds or in reverse. In much the same way as in the conventional transmission this spline shaft is driven from the driving shaft. To this end a sliding gear 57 is non-rotatably mounted on shaft 33 and at its front end is provided with internal clutch teeth 59 which are to be engaged with clutch teeth 29 by a forward movement of gear 57. Under these circumstances the spline shaft 33 is rotated at the same rate as the driving shaft 23. Gear teeth 27 on the drive shaft are in constant engagement with gear teeth 61 on a countershaft 63 rotatably mounted on a rod 65 carried in the front wall of the housing and in an intermediate partition 67. The shaft 63 may be fixedly held in position by a fastening means 69. The countershaft is also provided with a gear member 71, a gear member 72 and a third gear member 73. For driving the spline shaft 33 at a speed somewhat below driving shaft 23 gear member 57 is moved into engagement with gear 71 on the countershaft. Under these circumstances the driving shaft 23 drives the countershaft through gears 27 and 61 and the countershaft drives the spline shaft through gears 71 and 57. A second gear 75 is slidably mounted on the spline shaft and may be moved into engagement with gear 72 of the countershaft whereupon the driving shaft drives the spline shaft through the countershaft at low speed. For driving the spline shaft in reverse gear 75 is moved to the right from its position shown in Figure 1 to a position in the plane of gear 73 of the countershaft. When so moved gear 75 is brought into engagement with a gear 77, not shown in Figure 1 but illustrated in Figure 2. This gear 77 rotates on a pin 79 secured by fastening means 81 in two upwardly directed projections 83 integral with the transmission housing. This gear 77 is in constant engagement with gear 73. It therefore serves to reverse the drive of the spline shaft in relation to the driving shaft.

The driven shaft 49 is arranged to be rotated at the same rate as the spline shaft or at a speed above that of the spline shaft. A clutch gear member 85 is assembled on flange 43 and secured thereto by fastening means 87. This clutch gear member has internal clutch teeth 89 and at the extremity of the radial flange is provided with internal gear teeth 91. Midway between the partition 37 and the rear wall of the transmission housing there is provided a bearing support 93 which, together with a bearing cap 95, receives a ring member 97 within which is a roller bearing 99. Within the inner race 101 of the bearing is positioned the overgear idler 103. It will be observed that the opening defined by parts 93 and 95 locates the bearing 99 and the overgear idler eccentrically with reference to the axis of the driven shaft 49. At the rear of the bearing 99 the overgear idler is formed with a radial flange 105 from which extends an internal gear 107. At the front of the bearing 99 the overgear idler carries an external pinion 109 by means of a spline and fastening ring 111. Slidably and non-rotatably mounted on the driven shaft is a sleeve 113. This sleeve has at its front end clutch teeth 115. Toward the rear end of the sleeve is a radial projection 117 which is engaged by a gear 119 keyed to the sleeve and held in position by suitable fastening means 121. The gear is shouldered as at 123 so as to form between the shoulder and the fastening means 121 a collar portion for engaging the fork 21. In the position of parts shown in the drawings the clutch teeth 115 are out of engagement with clutch teeth 89, the gear 119, however, being in mesh with gear 107. Under these circumstances the spline shaft 33, when clutched to driving shaft 23, drives the internal idler 103 through the engagement of teeth 91 and the gear 109. The relative size of the parts is such that the internal idler is driven at a speed above that of the spline shaft. The internal idler, furthermore, is driving the driven shaft through gear engagement, 107 and 119 with the result that the driven shaft is still further speeded above the driving shaft. If now the sliding sleeve 113 is moved to the rear gear elements 107 and 119 are disengaged and clutch teeth 115 and 89 are brought into engagement with the result that the spline shaft drives the driven shaft at the same speed as it is being driven. Under these circumstances the internal double gear element is being idly driven, the engagement of gear members 91 and 109 remaining in mesh. By the arrangements described it will be seen that the shaft 33 is driven in substantially the same way that the conventional spline shaft is driven. The gear member 103 is provided with a very substantial bearing within the gearing housing, its gear elements being located at each end of the bearing, the sliding member to affect the clutch or gear engagement having a long bearing on driven shaft 49.

Fig. 3 shows a modification of the form already described which is intended to still further facilitate assembly and removal of parts and to reduce the size of certain of the gear elements. In Fig. 3 the gear housing is represented by numeral 7, 9 represents the cover and 11 the upwardly enlargement for the shift lever 13. The shifting mechanism is substantially like that in the form already described, one difference being the separation of the long shift fork for the overgear, this being fastened to the shifting plate by rivets or the like, as shown at 20.

The driving shaft is represented by numeral 23, its bearings on the front wall by numeral 25. 27 and 29 are the gear teeth and clutch teeth as before. 31 represents the front end of the spline shaft 33 in its bearings 35. The rear end of the spline shaft is mounted in bearings 41, the outer race being held in a suitable support 38 carried by the housing. The spline shaft engages by a radial flange 43 the rear end of the bearing 41 and at the front of the bearing there is a ring 46 held by suitable fastening means 48. The front end of the driven shaft 49 is reduced at 53 and rotates within bearings 55 as in the form already described. This shaft extends out through bearings 51 in the rear wall as before.

On the spline shaft is a sliding gear 57 having internal clutch teeth 59 to engage teeth 29. Also slidably and non-rotatably mounted on the spline shaft is a gear 75. The countershaft is shown at 63, its bearing support being in the front wall of the transmission housing and in the intermediate partition 38. The countershaft has driven gear 61 and also gears 71, 72 and 73. The reverse idler is not shown, and is the same as the form already described. The spline shaft may therefore be driven in clutch engagement with shaft 23 or may be driven at two lower speeds than said shaft 23 or in a reverse direction.

For driving the driven shaft 49 at the same speed as the spline shaft or at a higher speed than the spline shaft the following arrangements are provided. A clutch gear member 86 has a rearward projection which is centered around the radial flange 43 of shaft 33. This element 86 is secured to the radial flange 43 by suitable fastening means 87. It is provided as before with clutch teeth 89 and is formed as an internal gear 92 which corresponds with the internal gear 91 but is considerably smaller than gear 91. Between the intermediate wall 38 and the end wall the housing is provided with a partition 94. Within the opening in partition 94 is received a ring 96 having an opening 98 eccentric with reference to the axis of the driven shaft. Within this opening are positioned bearings 100 rotatably supporting the overgear idler 102. This idler corresponds with the idler 103 of the form already described. At its front end it has an external pinion 104 which meshes with internal gear 92. At its rear end it has a radial flange 106 terminated within an internal gear 108. The flange 106 engages the bearing 100 at the rear end and a ring 110 held by suitable means 110′ inserted from within the overgear idler engages the front end of the bearing and holds the overgear idler from longitudinal movement in its bearing. Ring 110 may be formed with notches or teeth 110² to permit assembly over pinion 104. Slidable on shaft 49 is a sleeve 112. The sleeve 112 by its forward end is provided with clutch teeth 115 as before to engage clutch teeth 89 for driving in normal high speed. The sleeve 112 is formed at its rear end with an integral gear 114 which meshes with internal gear 108 for driving the driven shaft at a speed above that of the driving shaft. By the use of smaller gear elements 92 and 106 it will be seen that it is possible to remove the overgear idler 102 through its bearings. This is a convenience in assembly and also makes it possible to construct the external pinion 104 as an integral part of the overgear idler. The smaller dimensions of these gear members also makes possible a reduction in the dimensions of the gear housing.

As a convenient method of holding the ring 96 in position I may provide a saw cut 120 in the upper part of the partition 94 and by means of a bolt 122 bind the adjacent portions of the partition against the ring 96. The ring 96 may have its upper portion slotted as shown at 124 to receive the bolt 122.

The method of assembly will be readily understood. The spline shaft together with the bearing 41 and gear 86, and bearing retaining means 46 and 48 may be described as a first sub-assembly. When placed in position a locking means 136 is positioned to engage the outer race and hold it from rotation. A second sub-assembly comprises the over gear idler 102 its bearings 100, and the eccentric ring 96. This sub-assembly, its parts secured together by the fastening means 110, and 110′ is positioned within the casing bearing and secured by the bolt 122. The third sub-assembly includes the driven shaft 49 carrying sleeve 112 and the end cover of the housing with the bearings 51.

As a still further improvement there has been devised as a substitute for the overgear idler a built up idler illustrated in Figure 5. In this figure numeral 96 shows the ring member which is to be clamped within the housing partition as before. Bearings 130 are received within the eccentric opening of ring 96. The overgear idler is shown as composed of two parts, 132 the forward part and 134 the rearward part. The part 132 is formed with the integral pinion 104 and part 134 with the integral internal gear 108, as in the form just described. The two parts 132 and 134 of the overgear idler are secured by a spline connection to a sleeve 138, suitable fastening means 140 being provided at the rear end of the sleeve 138 to hold the elements assembled on sleeve 138. The sliding sleeve 112 is similar in all respects in structure and function to the corresponding part shown in Figure 3. The advantages from the point of view of convenience and manufacture and assembly will be evident.

This application is a companion to my application for overgear shift mechanism, Serial No. 215,413, filed August 25, 1927.

I claim:

1. In a change speed transmission, an internal idler gear ring for interposition between a driving and a driven member, said idler composed of two rings of equal diameter assembled in axial alignment, one ring terminating in an external pinion, the other in an internal gear, a supporting ring upon which said gear rings are assembled and means to secure said gear rings to said supporting ring.

2. In a change speed transmission, an internal idler gear ring for interposition between driving and driven members, said idler composed of two aligned gear rings, integral gear teeth on the remote ends of the said gear rings for the engagement of the driving and driven members, said gear teeth being spaced to receive bearings for the support of said idler between said teeth, a supporting ring upon which the said gear rings are assembled and means to secure said gear rings upon said supporting ring.

In testimony whereof I affix my signature.

HAROLD DREW.